Jan. 10, 1933.　　　H. M. STETTNER　　　1,893,718
ANTISKID DEVICE
Filed June 6, 1931　　　3 Sheets-Sheet 1

INVENTOR
HENRY M. STETTNER
BY
ATTORNEY

Jan. 10, 1933.  H. M. STETTNER  1,893,718
ANTISKID DEVICE
Filed June 6, 1931   3 Sheets-Sheet 2

INVENTOR
HENRY M. STETTNER
BY
ATTORNEY

Jan. 10, 1933.                H. M. STETTNER                    1,893,718
                               ANTISKID DEVICE
                              Filed June 6, 1931         3 Sheets-Sheet 3
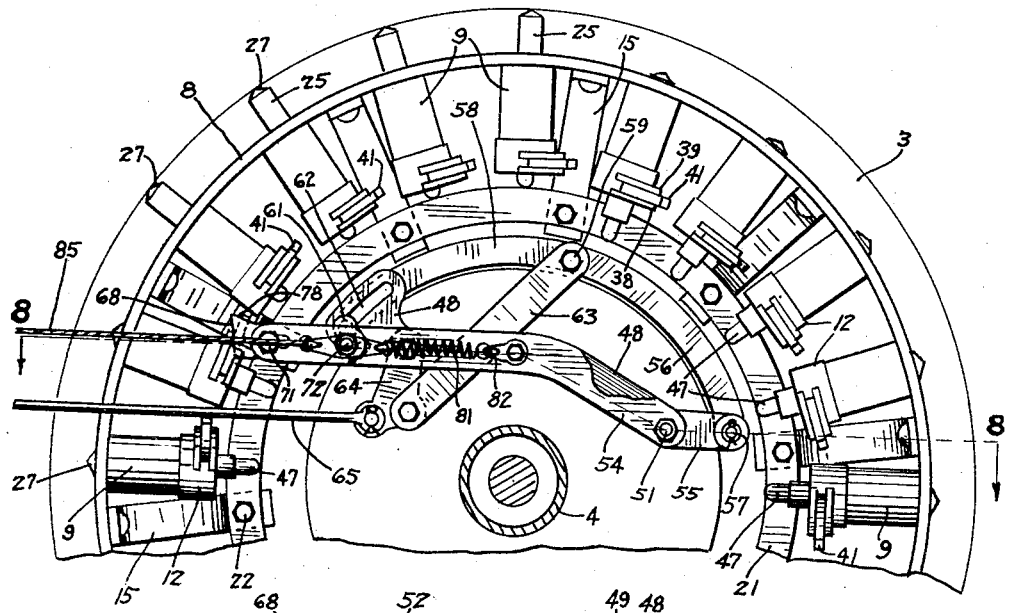
Fig. 6.
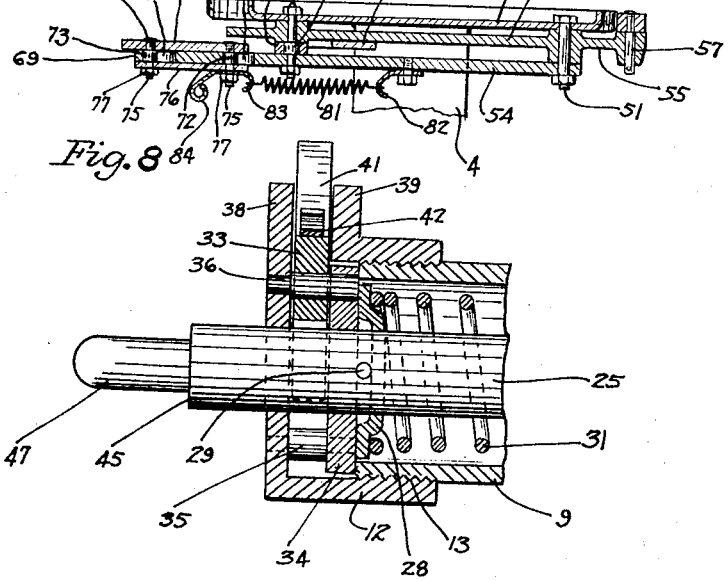
Fig. 8.
Fig. 7.
INVENTOR
HENRY M. STETTNER
BY
ATTORNEY Patented Jan. 10, 1933

1,893,718

UNITED STATES PATENT OFFICE

HENRY M. STETTNER, OF ST. PAUL, MINNESOTA

ANTISKID DEVICE

Application filed June 6, 1931. Serial No. 542,578.

This invention relates to new and useful improvements in anti-skid devices.

An object of the invention is to provide an anti-skid device which may be attached to the wheel of an automobile and which has means convenient to the driver's seat for rendering it operative to prevent the wheel from skidding.

A further object of the invention is to provide an anti-skid device comprising a plurality of radially movable ground engaging elements normally positioned substantially within the circumference of the wheel, and having means for operating them to move them outwardly whereby the terminals thereof will engage the ground surface and thereby prevent the wheel from skidding.

A further object is to provide an anti-skid device comprising a support having means for securing it to the wheel felly, and a plurality of ground engaging elements being mounted in suitable guides provided on said support and having means for normally retaining them in inoperative positions, and mechanism being provided for actuating said elements to move them into operative positions whereby they will engage the ground surface, said operating mechanism being adapted to be supported upon a fixed part of the vehicle, such as the usual brake drum of the axle housing.

A further object is to provide an anti-skid device comprising a plurality of radially movable ground-engaging elements adapted to be attached to the vehicle wheel and having tension means normally retaining them in inoperative positions, and means being provided adjacent to the driver's seat for controlling the operation of said ground engaging elements and means also being provided in connection with said control means whereby the automobile wheel may be rotated in either direction, regardless of the position of said operating mechanism.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 6 is a view similar to Figure 2, showing the operating mechanism positioned to engage the dogs and move them out of engagement with their respective ground-engaging studs, whereby the latter are returned to their normal inoperative positions;

Figure 7 is an enlarged detail sectional view on the line 7—7 of Figure 5; and

Figure 8 is a detail sectional view on the line 8—8 of Figure 6.

Figures 1, 4, 5:
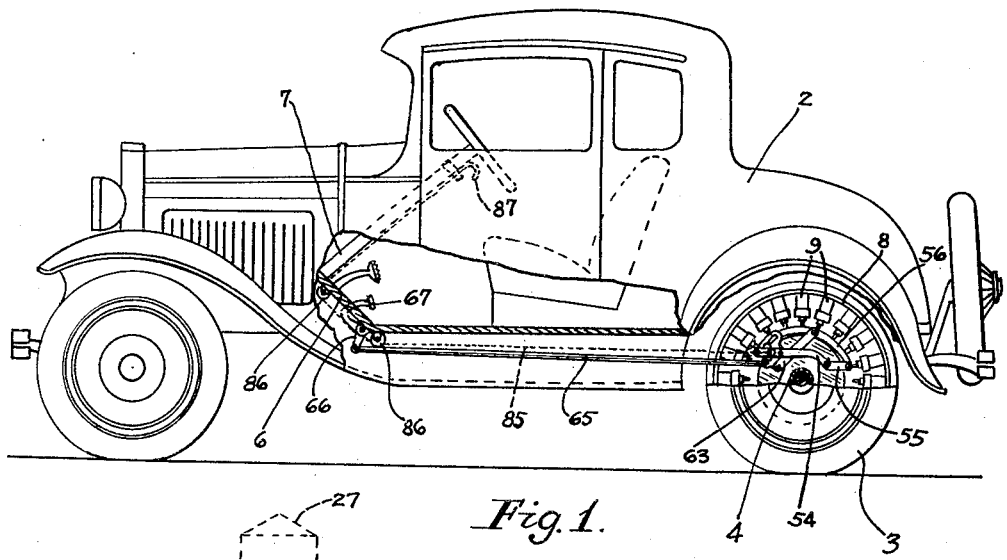
Figure 1 is a view showing a conventional type of automobile with the invention embodied in a rear wheel thereof.
Figure 4 is an enlarged detail sectional view on the line 4—4 of Figure 5.
Figure 5 is a cross sectional view on the line 5—5 of Figure 4, showing the dog out of locking engagement with the stud.

In the selected embodiment of the invention here shown, there is illustrated in Figure 1, an automobile comprising the usual body 2, rear wheels 3, axle housing 4, brake drum 5, the usual foot board 6, and steering post 7.

The anti-skid device featured in this invention is shown comprising an annular support 8, preferably of strap iron having a plurality of suitable guides 9 secured thereto, as by screw threads 11. The guides 9 are here shown as of cylindrical cross section, and each is provided at its inner end with a suitable cap 12 secured thereto by suitable screw threads 13.

Figure 3:
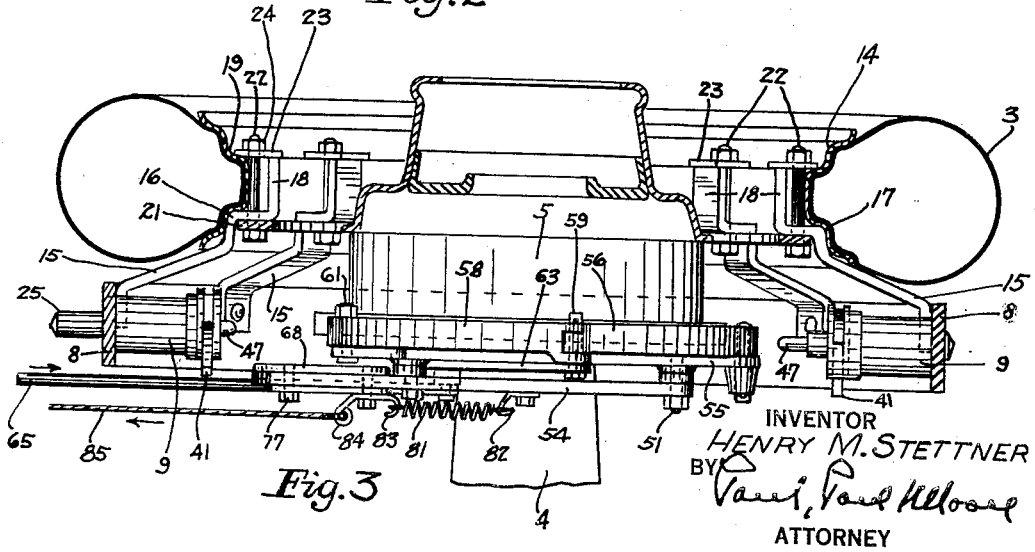
Figure 3 is a detail sectional view on the line 3—3 of Figure 2, showing at the right hand side of the wheel, one of the elements in normal inoperative position, and the element at the left hand side of the figure being shown in extended operative position.

The annular support 8 is shown secured to the usual felly 14 of the wheel by suitable brackets 15, the outer ends of which are rigidly secured to the support 8 by such means as riveting or spot welding, and the inner ends thereof being shaped as best shown in Figure 3, whereby a right angle portion 16 is provided on each bracket 15 adapted to be seated against the inner annular shoulder 17 of the wheel felly 14. Each bracket 15 is further provided with an extension 18 adapted to project between the spokes of the wheel and terminating substantially in alinement with the outer shoulder 19 of the wheel felly. An annular clamping member 21 is adapted to be seated against the inner angled portions 16 of the brackets 15 and is provided with a plurality of apertures, each of which is alined with a corresponding aperture provided in the angled portion 16 of the brackets 15. Suitable clamping bolts 22 traverse the alined apertures provided in the clamping ring 21 and brackets 15, and the outer end portions of these bolts are adapted to receive clamping plates 23 which have their inner ends seated against the terminals of the extensions 18 of the brackets, and their opposite ends seated against the annular shoulder 19 provided at the outer face of the wheel. When the nuts 24 of the bolts 22 are tightened, the brackets will be securely clamped to the wheel felly as will readily be understood by reference to Figure 3.

The means provided for engaging the ground surface to prevent skidding of the wheel comprises a plurality of ground-engaging elements or studs 25 which are slidably mounted in the guides 9 of the annular support 8, as clearly illustrated in Figure 4. As all of the studs and their supports are alike in construction, but one such unit need be described in detail.

The stud 25 has one end passing through an aperture 26 provided in the outer end of the guide 9, and its terminal 27 is preferably cone-shaped or pointed, as shown in Figure 4, so as to cause it to tend to dig into the ground surface, when engaged therewith. A suitable washer or disk 28 is provided upon the stud within the guide 9, and is seated against a pin 29 secured in the stud. A suitable spring 31 is coiled about the stud 25 within the guide 9, and has one end seated against the head 32 at the outer end of the guide and its opposite end seated against the washer 28. By thus mounting the spring upon the stud 25, the spring constantly urges the stud in an inward direction, as will readily be understood by reference to Figure 4. When positioned as shown in full lines in Figure 4, the terminal 27 of the stud will be positioned so as not to engage the ground when the wheel is rotated. The dotted line position in this same figure illustrates the position of the stud when extended to engage the ground surface. (See Figure 2).

Means is provided within the guide 9 adapted to lock the stud 25 in its operative position, indicated by the dotted lines in Figure 4. Such means is shown in Figures 4, 5, and 7, and comprises a dog 33 pivotally mounted within the cap 12 of the guide as shown in Figure 4. To movably support the dog 33 within the cap 12, a suitable washer or circular plate 34 is secured to the cap by means of a plurality of shouldered studs 35—35 and 36, which act as spacers between the inner end 37 of the cap 12 and the plate 34. The dog 33 is mounted between the plate 34 and the portion 37 of the cap, and is pivotally retained therein by means of the stud 36 which passes through an aperture provided in the dog. Projecting guide flanges 38 and 39 are provided on the cap 12 between which the outer end portion 41 of the dog moves, as indicated by the full and dotted lines in Figure 5. A suitable spring 42 has one end secured to the cap 12 by such means as a screw 43 while the opposite free end is disposed between the flanges 38 and 39 and bears against the dog 33 and constantly tends to move it in a direction to cause the hook-like end portion 44 thereof to engage the annular shoulder 45 provided upon the inner end of the stud as shown in Figure 4. The dog is movable in a suitable aperture or slot 46 provided in the wall of the cap 12, as will be clearly understood by reference to Figures 5 and 7.

When the stud is in its retracted position, as shown in full lines in Figure 4, the hook-like portion 44 of the dog will ride upon the periphery of the stud, as clearly shown in Figure 5. When, however, the stud is moved outwardly to the dotted line position shown in Figure 4, the spring 42 will cause the portion 44 of the dog to move into engagement with the reduced end portion 47 of the stud, whereby it will engage the annular shoulder 45 of the stud and thus prevent the latter from returning to its normal retracted position. When the dog is moved from the dotted line position, indicated at A in Figure 5 to the dotted line position indicated at B in this same figure, the portion 44 thereof will move out of engagement with the annular shoulder 45, whereupon the spring 31 will cause the stud to be immediately returned to its normal inoperative position, as shown in full lines in Figure 4.

Figure 2:
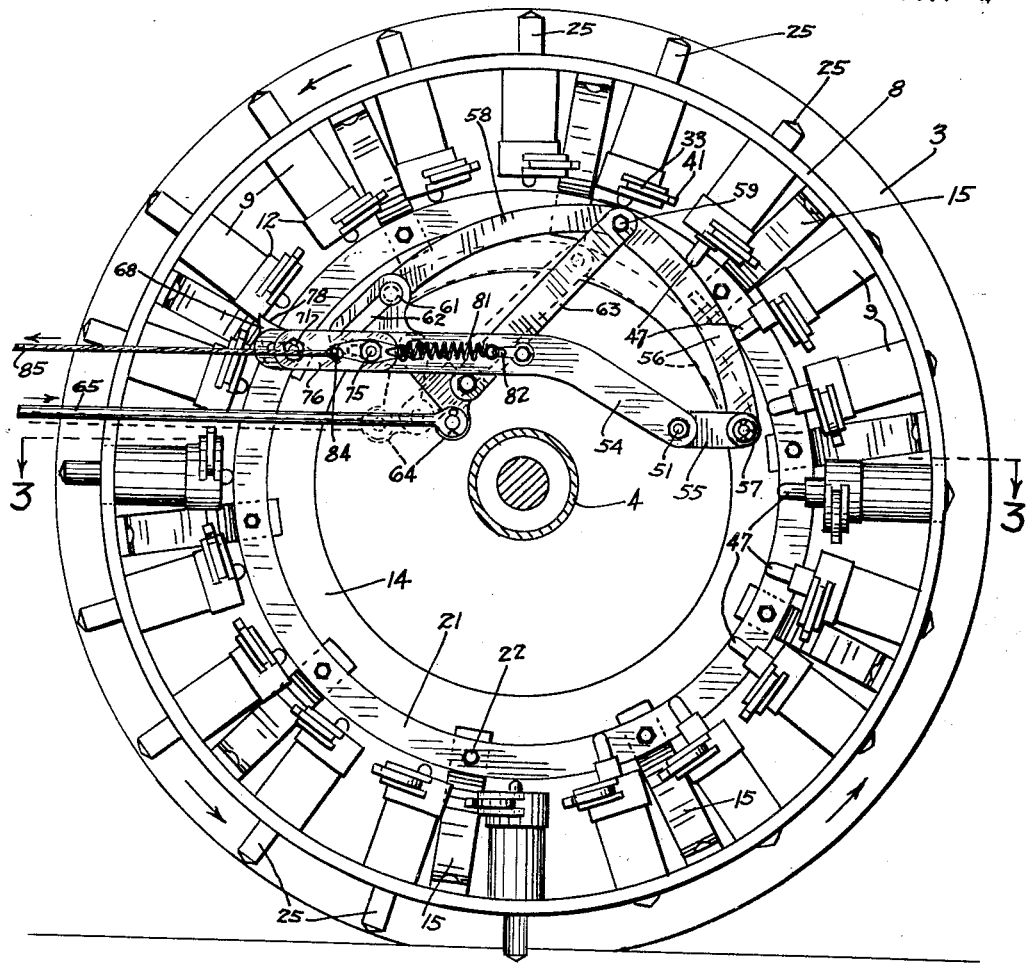
Figure 2 is an enlarged inside elevational view of the invention showing the general arrangement of the ground-engaging elements and the operating mechanism therefor, said mechanism being shown positioned to cause said elements to be moved into operative positions.

The means provided for operating the studs 25 to cause them to move into and out of operative positions is best shown in Figures 2, 6, and 8. A supporting bar 48 is suitably secured to a fixed portion of the automobile chassis as, for example, the wall 49 of the brake drum 5, by such means as bolts 51 and 52, the latter being shown provided with an enlarged central portion 53 which acts as a spacer between the bar 48 and another bar 54 which also is secured in fixed relation to the brake drum by means of the bolts 51 and 52. The bar 48 has an extension 55 to which a cam bar 56 is pivotally secured by a suitable pin 57. The opposite end of the cam bar 56 is pivotally connected to one end of an arcuately formed bar 58 by a pin 59, the opposite end of which has a flanged stud 61 secured thereto which operates in a guide slot 62 provided in the opposite end of the fixed bar 48. By thus pivotally connecting together the bars 56 and 58, they may be moved from the positions shown in Figure 6 to the positions shown in Figure 2, as will subsequently be described.

The means for operating the cam bar 56 comprises a link 63 having one end pivotally connected to the bars 56 and 58 by means of the pin 59, and the opposite end of which is pivotally connected to a bell crank 64 supported upon the enlarged portion 53 of the bolt 52 and adapted to swing thereon. An operating rod 65 has one end connected to the bell crank and has its opposite end connected to an arm 66 provided upon a foot pedal 67 situated convenient to the driver's seat, as shown in Figure 1. When the foot pedal 67 is depressed, the bell crank 64 will be moved from the dotted to the full line position shown in Figure 2, whereby the cam bar 56 will be moved from the full line position shown in Figure 6 to the full line position shown in Figure 2, thereby causing the reduced terminals 47 of the studs to successively engage said cam bar whereby the studs 25 will be moved outwardly against the tensions of the springs 31 to the dotted line positions shown in Figure 4, whereby the dogs 33 will snap into locking engagement therewith and thereby retain the studs in their extended operative positions, as shown at the left hand side of Figure 2. A suitable spring, not shown, normally retains the cam bar 56 and the foot pedal 67 in their normal inoperative positions, as shown in Figure 1.

The arcuately formed bar 58 functions as a means of preventing the inner reduced terminals 47 of the studs from striking against the swinging end of the cam bar 56, in the event that the direction of movement of the vehicle is reversed so that the wheel is rotated in a backwardly direction. When such an occurrence arises and the cam bar is in operative position, the inner reduced terminals 47 of the studs 25 will engage the bar 58, whereupon the studs will be moved outwardly into locking engagement with the dogs 33, thereby positively preventing the inner ends of the studs from accidentally becoming locked with the swinging end of the cam bar 56.

The means provided for releasing the dogs from the studs 25 to permit the latter to return to their normal retracted positions is shown in Figures 2, 6, and 8, and comprises a small slide 68 movably mounted upon the end portion 69 of the fixed bar 54. This slide is shown supported by means of a pair of studs 71 and 72, each having one end secured to the slide and being provided with enlarged portions 73 slidable in slots 74 provided in the end portion 69 of the bar 54. The opposite reduced end portions 75 of the studs 71 and 72 are engaged with a plate 76 and are secured thereto by the nuts 77 of the studs 71 and 72. The outer end portion of the slide 68 is provided with a cam face 78 adapted to be moved into the path of the projections 41 of the dogs 33, as will be clearly understood by reference to Figure 6. When the slide is thus positioned, the projections 41 of the dogs will successively engage the cam face 78, whereupon the dogs will be operated to release the studs and thus permit the latter to return to their normal retracted position, as shown at the right hand side of Figures 2 and 6.

A suitable tension spring 81 has one end secured to the bar 54 by a suitable hook member 82, and its opposite end engaged with the slide 68 by means of a suitable hook member 83, which also is shown provided with an eye 84 to which a suitable cable or operating member 85 may be connected, as shown in Figure 3. The opposite end of the cable 85 may extend forwardly around suitable sheaves or pulleys 86, provided beneath the floor board 6 of the vehicle and preferably has a suitable operating handle 87 suitably supported upon the steering post 7, so that the driver may conveniently manipulate said handle to cause actuation of the slide 68. The spring 81 normally returns the slide 68 to its normal inoperative position, shown in Figure 2.

When it is desired to cause the studs 25 to move into operative positions, the driver will depress the foot pedal 67, whereupon the cam bar 56 will be moved from the full line position shown in Figure 6 to the full line position shown in Figure 2, thereby causing the reduced terminals 47 of the studs 45 to successively engage the cam bar 56, whereby the studs will be moved outwardly to their operative positions against the tensions of the springs 31. When the studs 25 are moved to their extended operative positions by the cam bar 56, the dogs 33 will snap into locking engagement therewith by the actions of the springs 42, and will be held in their operative positions until the slide 68 is actuated by manipulation of the control levers 87 provided upon the steering post. When this control lever is operated, the slide 68 will be moved from the position shown in Figure 2 to that shown in Figure 6, whereby the projections 41 of the dogs 33 will successively engage the cam face 78 of the slide 68 and thus move the dogs out of engagement with the shoulders 45 of the studs, thereby permitting the springs 31 to return the studs to their normal retracted positions.

The construction of the device, as a whole, is such that it may be quickly installed upon a vehicle and provides means whereby skidding of the wheels may be positively prevented. The outside diameter of the annular support 8 is comparatively less than the diameter of the tire, so that when the studs 25 are in retracted positions, as shown at the lower right hand side of Figure 2, they cannot engage the ground surface unless the tire becomes deflated. Should the tire become deflated, the load may be temporarily carried upon the annular support 8 until the deflated tire has been removed from the wheel and repaired, or until another one has been substituted therefor. This novel device may, therefore, be used in an emergency to carry the load of the vehicle in the event that the tire is punctured and the driver desires to drive to a near-by service station to have the tire repaired or another one substituted therefor.

I claim as my invention:

1. In an anti-skid device, a support adapted to be secured to a wheel, a cylinder secured to said support and having a wall at one end provided with an aperture, a head demountably secured to the opposite end of said cylinder, a plate mounted in said head and adapted to be seated against the end of the cylinder, means for spacing said plate from the end wall of said head to provide a chamber between said plate and said end wall, a stud mounted in said cylinder and having one end portion projecting through the aperture provided in the end wall of the cylinder and having its opposite end projecting through alined apertures in said plate and the end wall of said head, a spring actuated dog pivotally mounted in said chamber and having an end portion adapted to lockingly engage said stud to secure the latter in operative position, and means for moving said dog out of locking engagement with said stud to permit the latter to return to inoperative position.

2. In an anti-skid device, a support adapted to be secured to a wheel, a cylinder secured to said support and having a wall at one end provided with an aperture, a head demountably secured to the opposite end of said cylinder and having an end wall, a plate mounted in said head and adapted to be seated against the other end of the cylinder, means for spacing said plate from the end wall of said head to provide a chamber between said plate and said end wall, a shouldered stud mounted in said cylinder and having its unshouldered end portion projecting through the aperture provided in the end wall of the cylinder, the shouldered end portion of said stud projecting through aligned apertures provided in said plate and the end wall of said head, a spring normally retaining said stud in inoperative position, means for moving said stud into operative position, a spring actuated dog mounted in said chamber and adapted to engage the shoulder on said stud to thereby lock the latter in operative position, and means for moving said dog out of locking engagement with said shoulder to permit the stud to return to its inoperative position.

3. In an anti-skid device, a support adapted to be secured to a wheel, a plurality of radially disposed guides mounted on said support and each comprising a hollow body having a wall at its outer end provided with an aperture, heads secured to the inner ends of said hollow bodies and each provided with an end wall having an aperture therein, a plate mounted in each head and spaced from the end wall thereof to provide a chamber in each head, said plates also having apertures therein alined with the apertures in the end walls of said bodies and said heads, studs mounted in said guides and having portions projecting through the apertures provided in the end walls thereof and having their opposite ends projecting through alined apertures provided in said plates and the end walls of said heads, spring-actuated dogs pivotally mounted in said chambers and having portions adapted to lockingly engage their respective studs to secure them in operative positions, and means for moving said dogs out of locking engagement with said studs to permit the latter to be returned to inoperative positions.

4. In an anti-skid device, a support adapted to be secured to a wheel, a plurality of radially disposed guides mounted on said support and each having an end wall at its outer end provided with an aperture, heads secured to the inner ends of said guides and each having an end wall provided with a suitable aperture, a second wall in each head spaced from the end walls thereof to provide a chamber in each head, said second walls also having apertures therein alined with said aforementioned apertures, spring-actuated studs mounted for reciprocal movement in said guides and having portions projecting through the apertures in the other ends of said guides, the inner end portions of said studs projecting through the alined apertures in the walls of said heads and traversing said chambers, means mounted in said chambers adapted to lockingly engage said studs to secure them in operative positions, and means for moving said locking means out of engagement with said studs to permit the latter to be returned to inoperative positions.

5. In an anti-skid device, a support adapted to be secured to a wheel, a plurality of radially disposed guides mounted on said support and each having an end wall at its outer end provided with an aperture, heads secured to the inner ends of said guides and each having an end wall provided with a suitable aperture, a second wall in each head spaced from the end walls thereof to provide a chamber in each head, said second walls also having apertures therein alined with the apertures in the end walls of said guides and heads, spring-actuated studs mounted for reciprocal movement in said guides and having portions projecting through the apertures in the end walls of said guides, the inner end portions of said studs projecting through the alined apertures in the walls of said heads, movable members mounted in said chambers adapted to lockingly engage said studs to secure them in operative positions, means for moving said studs into operative positions whereby said movable members will move into locking engagement therewith, and means for moving said locking members out of engagement with their respective studs to permit the latter to be returned to inoperative positions.

In witness whereof, I have hereunto set my hand this 4th day of June, 1931.

HENRY M. STETTNER.